(12) United States Patent
Kespohl

(10) Patent No.: US 8,282,165 B2
(45) Date of Patent: Oct. 9, 2012

(54) REBOARD SYSTEM

(75) Inventor: Horst Kespohl, Aichelberg (DE)

(73) Assignee: RECARO Child Safety GmbH & Co. KG, Marktleugast (DE)

( * ) Notice: Subject to any disclaimer, the term of this patent is extended or adjusted under 35 U.S.C. 154(b) by 415 days.

(21) Appl. No.: 12/356,821

(22) Filed: Jan. 21, 2009

(65) Prior Publication Data

US 2009/0167065 A1 Jul. 2, 2009

Related U.S. Application Data

(63) Continuation-in-part of application No. 11/114,499, filed on Apr. 26, 2005, now abandoned.

(30) Foreign Application Priority Data

Apr. 28, 2004 (DE) .......................... 10 2004 020 902

(51) Int. Cl.
- *B60N 2/26* (2006.01)
- *A47D 1/10* (2006.01)
- *A47C 7/62* (2006.01)

(52) U.S. Cl. ............. 297/256.11; 297/250.1; 297/184.13

(58) Field of Classification Search ................ 297/250.1, 297/256.1, 256.11, 184.13
See application file for complete search history.

(56) References Cited

U.S. PATENT DOCUMENTS

| 4,810,030 A | * | 3/1989 | Lewis ...................... 297/184.17 |
| 5,002,338 A | | 3/1991 | Gisser |
| 6,030,047 A | | 2/2000 | Kain |
| 6,126,234 A | | 10/2000 | Cabagnero |
| 6,135,553 A | | 10/2000 | Lovie et al. |
| 6,467,840 B1 | * | 10/2002 | Verbovszky et al. ..... 297/219.12 |
| 6,478,377 B2 | * | 11/2002 | Kassai et al. ............... 297/256.1 |
| 6,688,685 B2 | | 2/2004 | Kain |
| 6,779,843 B2 | | 8/2004 | Kain |
| 6,908,151 B2 | | 6/2005 | Meeker et al. |
| 7,021,710 B2 | | 4/2006 | Kain et al. |
| 7,438,358 B2 | * | 10/2008 | Jane Santamaria ........ 297/256.1 |
| 2003/0164631 A1 | | 9/2003 | Sedlack |
| 2003/0164632 A1 | | 9/2003 | Sedlack |
| 2010/0123342 A1 | * | 5/2010 | Mostert et al. ........... 297/256.13 |

* cited by examiner

*Primary Examiner* — David Dunn
*Assistant Examiner* — Tania Abraham
(74) *Attorney, Agent, or Firm* — Pandiscio & Pandiscio

(57) ABSTRACT

The invention is directed to a reboard system comprising a steeply inclined backrest for transporting infants and toddlers approximately in a half-lying, half-sitting posture, particularly in a car opposite the direction of travel thereof, it being possible to vary the length of the backrest in the direction of the spine of an infant sitting in the reboard system when a child is in the reboard system and/or when the reboard system is fastened to a seat of a car opposite the direction of travel thereof, by a guided parallel shift of an extendible part of the backrest relative to said seat surface along a straight line, which is inclined by a constant acute angle α against the horizontal plane in the direction of travel, whereby the extendible part (10) of the backrest (6) is provided with upper lateral body rests (12) for substantially guiding the shoulders and/or upper arms of the infant during the travel in a car.

55 Claims, 5 Drawing Sheets

REBOARD SYSTEM

REFERENCE TO PENDING PRIOR PATENT APPLICATIONS

This patent application is a continuation-in-part of prior U.S. patent application Ser. No. 11/114,499, filed Apr. 26, 2005 now abandoned by Horst Kespohl for REBOARD SYSTEM, which in turn claims benefit of German Patent Application No. 10 2004 020 902.2, filed Apr. 28, 2004.

The two (2) above-identified patent applications are hereby incorporated herein by reference.

BACKGROUND OF THE INVENTION

1. Field of the Invention

The invention relates to a reboard system for transporting babies and toddlers in a posture approximately half-lying, half-sitting, particularly in a car opposite the direction of travel thereof, comprising a seat surface and a very even, only slightly inclined backrest.

2. Description of the Prior Art

The U.S. Pat. No. 6,135,553 of Lovie et al. discloses a child safety seat for a motor vehicle comprising a seat body having a back portion and a seat portion, an upper back support mounted on the back portion for movement in a direction towards and away from the seat portion. The upper back support is movable relative to the back portion and the angle between the upper back support and the seat portion decreases as the upper back support moves towards the seat portion. Such decreasing angle is necessary at Lovie et al., as this child safety seat is to be mounted in car facing in the direction of travel of the car; therefore, the backrest of the child safety seat abuts against the backrest of the car's seat and cannot be displaced, especially extended in a horizontal direction beyond the backrest of the child safety seat. Therefore, larger kids can be seated in this seat facing into the direction of travel of the car in a very upright position, whereas smaller children may take a rather flat position. Nevertheless, all children including newborns have to be seated facing into the direction of travel. This is very dangerous for newborns, because they are very small and their head is much too heavy for the neck musculature, so that, in case of a frontal collision of the car, they cannot hold and stabilize their head, but are rather endangered by a neck fracture.

Furthermore, as the angle between the upper back support and the seat portion decreases as the upper back support moves towards the seat portion, the back portion cannot be adjusted as a child is seated inside this child safety seat, because the lower part of the moveable part of the backrest moves significantly towards the front end of the child safety seat upon shifting it in its lower position, thereby pushing a child away from the backrest towards the front end of the child safety seat. A child fastened with a seat belt would be squeezed between the seat belt and the backrest and could be seriously injured.

For this reason, the adjusting mechanism of the upper back support is interlocked with the belt of the child safety seat and can only by activated if the seat belt of the child safety seat is not fastened.

Additionally, as the locking lever is positioned at the rear surface of the backrest and the child safety seat is mounted in a car with its backrest abutting against the backrest of the car's seat, the locking lever can be activated only if the child safety seat is not mounted or even placed inside a car.

Finally, at Lovie et al., the movable portion of the backrest shows only two lateral head rests, but no lateral shoulder or arm rests. For this reason, the broadest part of the body—the shoulder area—which is most endangered at side collisions, is barely protected, and will be injured at first in case of an accident with lateral impact.

In some countries, children weighing less than 9 kg must sit in a car facing opposite its direction of travel. For this purpose there are so-called reboard systems that are fastened to a vehicle seat opposite the direction of travel, i.e., with the backrest forward. These seats are designed for a maximum body weight of between 9 and 13 kg, which is reached by babies and toddlers between the ages of roughly 9 and 15 months.

It should be kept in mind, however, that at birth infants weigh at most only about ¼ to ⅓ of this amount and are barely restrained adequately in a conventional reboard system, so that they are poorly protected in the event of a collision, for example.

In addition, the reboard system is anchored to a vehicle seat by means of a three-point belt proper to the vehicle, which is passed in front of the backrest of the reboard system and then joined to the belt buckle provided for the purpose. The maximum belt length supplied in ordinary vehicles limits the overall dimensions of a reboard system. This, in turn, means that a child will grow out of a conventional reboard system fairly soon and the seat will therefore no longer support the child's head adequately.

SUMMARY OF THE INVENTION

The described disadvantages of the prior art give rise to the problem initiating the invention, that of designing a child's seat in such a way that it can be used in all countries, even if a mounting opposite to the direction of travel of a car is required by law, which provides adequate retention and safety for an infant for the entire time from birth to the point when its weight reaches 13 kg as a maximum, and which can be adjusted even if a child is sitting inside the seat and the belt of the child's seat is fastened without squeezing the child, and even if the child's seat is mounted inside a car.

This problem is solved by the fact that the child's seat is designed as a reboard system facing opposite the direction of travel, whereby the length of the backrest can be varied roughly in the direction of the spine of an infant sitting in the reboard system, in particular even when a child is in the reboard system and/or when the reboard system is fastened to a seat in a car opposite the direction of travel thereof, by a guided parallel shift of an extendible part of the backrest relative to said seat surface along a straight line, which is inclined by a constant angle $\alpha$ against the horizontal plane, rising in the direction of travel of the car, whereby the extendible part of the backrest is provided with upper lateral body rests for substantially guiding the shoulders and/or upper arms and/or head of the infant during the travel in a car.

By this means, the backrest can be adapted to the needs of the moment: for newborns, the length of the backrest is minimized by pushing down a region optionally flanked by lateral supports, which thus acts in the manner of a seat size reducer, i.e., provides the infant with improved lateral support. Later the backrest can be adapted to the growth of the child, preferably by sliding out the region optionally provided with lateral supports. The extendible region increasingly acts as a rest for the head and shoulders alone, while a region beneath it that is preferably also enlarged laterally remains as the backrest and gives the growing child more room. Thus, the reboard system "grows" with the child and always protects it optimally.

Conversely, the backrest can also be shortened temporarily, for example when the reboard system is to be installed in a car and a three-point belt must be slipped over it for this purpose. This is not unimportant, since many three-point belts are relatively short even in their maximally extended position and thus can barely be pulled over a conventional reboard system, let alone the lengthened backrest of a reboard system according to the invention. Since when being installed in a car the entire reboard system with a child sitting or lying in it is usually placed on the car seat concerned, adjusting the backrest should be possible precisely when a child is in the reboard system, and even when a belt of the reboard system is fastened around the child. This is achieved by the fact that the extendible portion of the backrest travels along a straight line in the direction of the spine of the child, without pushing the child forward.

To protect the infant during side-on collisions, the displaceable portion of the backrest is provided with upper lateral body rests. An advantageous design rule provides that the longitudinal extent of the upper lateral body rests in the longitudinal direction of the backrest roughly corresponds to the minimum length of the backrest. The retracted portion of the backrest consequently acts as a complete seat size reducer. It is further significant for this function that the upper lateral body rests be located between, i.e. within, upper lateral body rests of the supporting, unchangeable region of the backrest. The upper lateral body rests do not only protect the head of the infant, but its shoulders and upper arms, too, in contrast to Lovie, who teaches no shoulder or arm rests at the displaceable portion of the backrest.

Further advantageous features are constituted by a guide for the adjusting mechanism that is as clearance-free as possible, high stability even during sudden, sharp accelerations or decelerations, and the ability to lock the seat in arbitrary or stepped intermediate positions so that a given configuration cannot alter spontaneously.

It is within the scope of the invention that the constant angle α of the straight line, along which the movable backrest portion can be extended, as measured from the back side of the backrest against the horizontal plane, is between 15° and 45°. As the reboard system shall be used for newborns, too, who should be transported in a nearly flat position, such angle α should be restricted to values underneath 45°, in contrast to Lovie et al. In this respect, the Lovie seat should not be used for newborns, as their spine is not strong enough for such steep seating position.

It has proven advantageous for a medial plane approximating the backrest to form with a medial plane approximating the seat surface an obtuse angle of approximately between 100° and 160°, preferably between 110° and 150°, particularly between 120° and 140°. Such a large included angle allows the infant a relaxed, nearly recumbent position in which almost no stress is placed on the spinal column, since the backrest acts more as a bed than as a leaning-type support. However, the backrest still slopes gently upward and ensures good retention in the event of sudden deceleration of the vehicle. Preferably, the supporting area of the backrest or a medial plane approximating it should be parallel to the straight line along which the movable backrest portion can be extended.

It falls within the scope of the invention that the length of the reboard system measured roughly parallel to the bearing surface is greater than its height measured roughly perpendicular to the bearing surface, preferably more than 1.3 times greater, particularly more than 1.6 times greater, preferably irrespective of the adjusted length of the backrest. From this size ratio it is evident that the posture of the infant is more recumbent than seated.

The maximum length of the backrest in its extended state is preferably 1.3 to 1.7 times, especially about 1.5 times the minimum length of the backrest in its retracted state. Such variability is necessary in order to meet the needs of the infant as its height increases from about 50 cm to about 85 cm.

The adjustability of the backrest can be achieved by the fact that a region supporting the head and shoulders of the (older) toddler can be displaced, i.e. pulled out, relative to the seat surface approximately in the direction of the spine of an infant sitting in the reboard system. As articulated hereinabove, this portion of the backrest can assume the function of a seat size reducer for newborns and provide the infant with the necessary lateral restraint even in this early stage of life. To this end, the displaceable portion of the backrest can in its retracted position reach downward almost to the seat surface.

To provide adequate support for the head of the older toddler as well, the displaceable portion of the backrest should in its extended position be able to be extended by about half the amount of its (minimum) extent parallel to the spine of the child. This being the case, the retracted backrest is adapted to the size of a newborn but still short enough so that a three-point belt of any passenger vehicle can be slipped over it.

It has proven effective from a design standpoint for the longitudinal extent of the displaceable portion of the backrest plus a lobe-like prolongation formed in the lower region thereof to be roughly equal to the longitudinal extent of the backrest. This makes it possible to shift the region of the transition from the displaceable back portion to the body of the reboard system approximately into the area of the baby's pelvis, where owing to the sharply curved interior of the seat said transition can be made without any pressure points that can be felt by the child.

Since the displaceable portion of the backrest is preferably at least partially embraced supportingly on its outer side by an unchangeable region of the backrest that is in particular integrated with the body of the reboard system, even when the extendible portion of the backrest is pulled out there still remains in the region of the lumbar spine a cross-sectionally bowl-shaped contour that provides optimum safety for the infant, even against side-on collisions or the like, at each stage of its development. Moreover, the displaceable portion of the backrest is additionally stabilized thereby and thus cannot bend appreciably during a sudden deceleration of the vehicle, but instead holds the child securely in its usual recumbent position.

The invention further provides that the top edge of the displaceable portion of the backrest in any extended position protrudes above the top edge of the unchangeable region of the backrest. Conversely, when the extendible portion of the backrest is in the fully retracted state, the extendible backrest region should protrude outwardly only little if at all with respect to the unchangeable backrest region, so that the length of the reboard system can be minimized by pushing the extendible portion of the backrest in and shorter three-point belts can be used if necessary. In the ideal case, the displaceable portion of the backrest in its fully retracted position is embraced completely by the unchangeable backrest portion.

Conversely, if the overall length of the reboard system when the backrest, particularly its movable portion, in the maximally extended state is equal to or greater than one and one-half times the length of a bottom bearing surface of the reboard system by which it is to be placed on a car seat, then even older infants will have ample room in a reboard system of this kind.

The invention further recommends that the backrest, particularly the displaceable portion of the backrest, protrude past a bottom bearing surface of the reboard system by which it is to be placed on a car seat at least by a quantity that is greater than one-third the length of the bearing surface, preferably greater than half the length of said bearing surface. Hence, only or primarily the backrest protrudes past the bearing surface, while the seat surface does so to a lesser extent or not at all. In this way, the reboard system can be pushed optimally up against the backrest of a car seat while at the same time resting on the car seat with full areal contact. This notwithstanding, the bearing surface of the reboard system can also be curved convexly in the longitudinal direction or can comprise runners in the manner of rockers, extending in the longitudinal direction of the reboard system, so that the reboard system can also be placed on a flat surface as a cradle. It is important that the most sharply curved region in the longitudinal direction of the reboard system have its inner face, where at any age the pelvic area of the child and hence the center of gravity of the reboard system is located, as directly above the bearing surface as possible. This ensures that regardless of the age of the child, the reboard system will always remain stable on a flat surface and will not be able to tip over, but will only rock at most.

To permit a predominantly recumbent position for the infant, the height of the horizontal top edge of the unchangeable portion of the backrest relative to the plane of the bearing surface should be between two and five times the minimum height of the seat surface relative to the plane of the bearing surface in roughly the region of the transition from the backrest to the seat surface.

It has been found effective to provide a plate- or lobe-shaped extension in the region of the bottom edge of the displaceable portion of the backrest. When the backrest is in the retracted state, this can either lie over the inner face of the unchangeable region of the backrest and/or over the seat surface, or it can insert into, and be then removable from, a slit in the region of the transition between the seat surface and the backrest. This lobe-shaped extension serves to impart a flat or only gently curving contour to the inner face of the backrest downward to the region intended for the baby's pelvis. This eliminates any pressure points in the region of the back that would be detrimental to the development of the spinal column. This extension could also, of course, be made of a rigid material, but a pliable material enables it to conform to the different curvature of the backrest or seat surface, depending on the degree of retraction.

The invention can be improved by having the plate- or lobe-shaped extension at the bottom end of the displaceable backrest be able to slide at least partially under the seat surface or the region of the transition between the backrest and the seat surface. The pushed-in portion of the backrest has sufficient space at that location so that the overall height of the reboard system need not be much greater than it was before. This is further aided by the fact that a lobe-shaped prolongation made of a flexible material can quickly be folded down into in a roughly horizontal position.

The extendible portion of the backrest is preferably displaceable along a guide in the unchangeable region of the backrest. This guide preferably follows a straight course, but it could also be gently curved.

According to a further design specification, the straight guide for the displaceable portion of the backrest is inclined with respect to a medial plane approximating the seat surface by an angle of between 100° and 160°, preferably between 110° and 150°, particularly between 120° and 140°, so that the inner face of the extendible portion of the backrest, regardless of its displaced position, remains roughly coplanar with its position in the retracted state.

It is recommended that the guide comprise undercuts, for example in the manner of dovetails, between the displaceable portion of the backrest and the supporting portion of the backrest. In this way, the position of the extendible portion of the backrest is reliably secured even under sharp accelerative or decelerative forces. Such undercuts can alternatively be formed by screw heads that pass through longitudinal slits on the respective other portion of the backrest and embrace the edges of the slits involved.

Complementarily thereto, it can be provided that the displaceable portion of the backrest can be locked in position on the backrest. This eliminates the sole degree of freedom of movement that remains during use, given the presence of the guide mechanism. Any possibility of injuries is completely removed in this way. The locking of the displaceable portion of the backrest on the backrest is effected by form-fit engagement, for example by means of a lock pin or the like, which, depending on the desired position, can be passed through various openings or recesses disposed on the displaceable portion of the backrest and/or on the unchangeable portion of the backrest. The lock pins are preferably inserted from the back side or outer side of the reboard system inward, so that they are accessible even when a child is in the reboard system. However, the means for this purpose can also be a clamp body that is anchored on the extendible portion of the backrest, for example by means of a (wing) bolt, and passes through or embraces the guide rail and is tightened thereon in frictional engagement to fasten it.

Also to protect the infant, disposed on each side of the seat surface is an upwardly extending side wall that could simultaneously act as an arm support. Such side walls of the seat surface are further suitable for fastening the reboard system to a vehicle seat if each is provided in its upper edge with a recess in which a safety belt proper to the vehicle can be laid.

Since the belt proper to the vehicle is not adapted to the needs of an infant or toddler, the invention provides on the reboard system a belt proper thereto, particularly a shoulder belt or harness belt. In this case, a belt buckle is located at the free end of a relatively short belt ribbon that is anchored or guided for example between the baby's legs in the region of the inner face of the reboard system or the seat surface. The tongues attached to the free ends of two harness shoulder belts can be inserted in said belt buckle.

The upper (visible) ends of the shoulder belts are to be guided through or anchored in slit-shaped recesses in the displaceable portion of the backrest, since in this way these guide points or anchoring points are always properly adjusted automatically as the reboard system is adapted to the increasing height of the infant.

The invention can be improved by having the shoulder belt guided through longitudinal recesses in the unchangeable portion of the backrest. This eliminates the need to rethread the shoulder belt when the extendible portion of the backrest is adjusted. These longitudinal recesses—like the slits in the extendible portion of the backrest that are aligned with them during any adjustment—preferably are located on both sides of a guide rail serving to effect said adjustment. The longitudinal recesses in the unchangeable portion of the backrest preferably run parallel to the guide rail; their width roughly corresponds to the width of the belt, and their length roughly to the maximum degree of displacement of the extendible portion of the backrest relative to the fixed portion of the backrest.

The invention is also distinguished by a carrying handle that is anchored, optionally adjustably, on the body of the reboard system. The reboard system can thus, after being removed from a vehicle, be taken along and used to carry the baby. The handle is preferably U-shaped, with each of its two ends anchored on a respective side of the reboard system.

A swivelable carrying handle may be fastened or articulated in the region of the transition between the backrest and the seat surface. The swiveling of the carrying handle provides access to the interior of the reboard system so that an infant can be placed in it or taken out of it. The handle can optionally be locked in one or more positions so that the reboard system cannot tilt and the baby can always be carried lying nearly horizontally, regardless of its height. To this end, it is further advantageous if such a carrying handle is attached to or articulated on the reboard system approximately in the region of the center of gravity. This center of gravity is always located roughly in the area of the transition from the seat surface to the backrest.

Further, the reboard system according to the present invention may comprise a canopy, which is disposed on the extendible portion of the backrest and protects an infant from rain or bright sunlight. The protection against rain and sunlight is very important for newborns, but even for older children, too. Most important is the protection of the infant's head. By fixing the canopy to the extendible portion of the backrest, the canopy has always an optimum position for protecting the head of the infant, independent of its size.

Furthermore, a child's seat is designed as a reboard system for mounting in a car facing opposite the direction of travel, whereby the length of said backrest can be varied approximately in the direction of the spine of an infant sitting in said reboard system even when a child is seated in said reboard system and/or when said reboard system is fastened on the seat of a car opposite the direction of travel thereof, by a guided parallel shift of an extendible part of the backrest relative to said seat surface along a line, which is inclined by an acute angle α against the horizontal plane, rising in the direction of travel of the car, whereby the extendible part of the backrest is provided with upper lateral body rests for substantially guiding the shoulders and/or upper arms and/or head of the infant during the travel in a car, and whereby each upper lateral body rest is divided by a step into an upper area used as lateral headrest, and into a lower area, used as lateral arm and/or shoulder rest. Such step at the upper lateral body rest of the extendible portion of the backrest combines two functions: On the one hand, the shoulders of the infant, which are laterally exposed beyond the rest of the body, are protect against injury in case of a lateral collision; on the other hand, at the shoulders of the infant the distance between the both lateral body rests is greater than the distance between the upper parts of the lateral body rests, which are used as headrests. For this reason, the elbowroom for the forearms is sufficient for the infant, whereas for head, a maximum degree of protection is provided.

Finally, it is the teaching of the invention that provided on said reboard system is a belt proper to the seat, particularly a harness belt, which is fed through transversely extending slits of the extendible backrest portion, whereby the transversely extending slits are provided at the same height as the steps between the upper area and the lower area of the upper lateral body rest of the extendible backrest portion. The position of the extendible part of the backrest should be adjusted so that the shoulder belts pass through the extendible backrest portion right above the shoulders of the infant. Then, the position of the step between head rest and arm or shoulder rest lies precisely at the correct height, namely barely above the infant's shoulders.

BRIEF DESCRIPTION OF THE DRAWINGS

Further features, characteristics, advantages and effects based on the invention will emerge from the following description of a preferred embodiment of the invention and an examination of the drawing. Therein.

DESCRIPTION OF THE PREFERRED EMBODIMENTS

Figure 1:
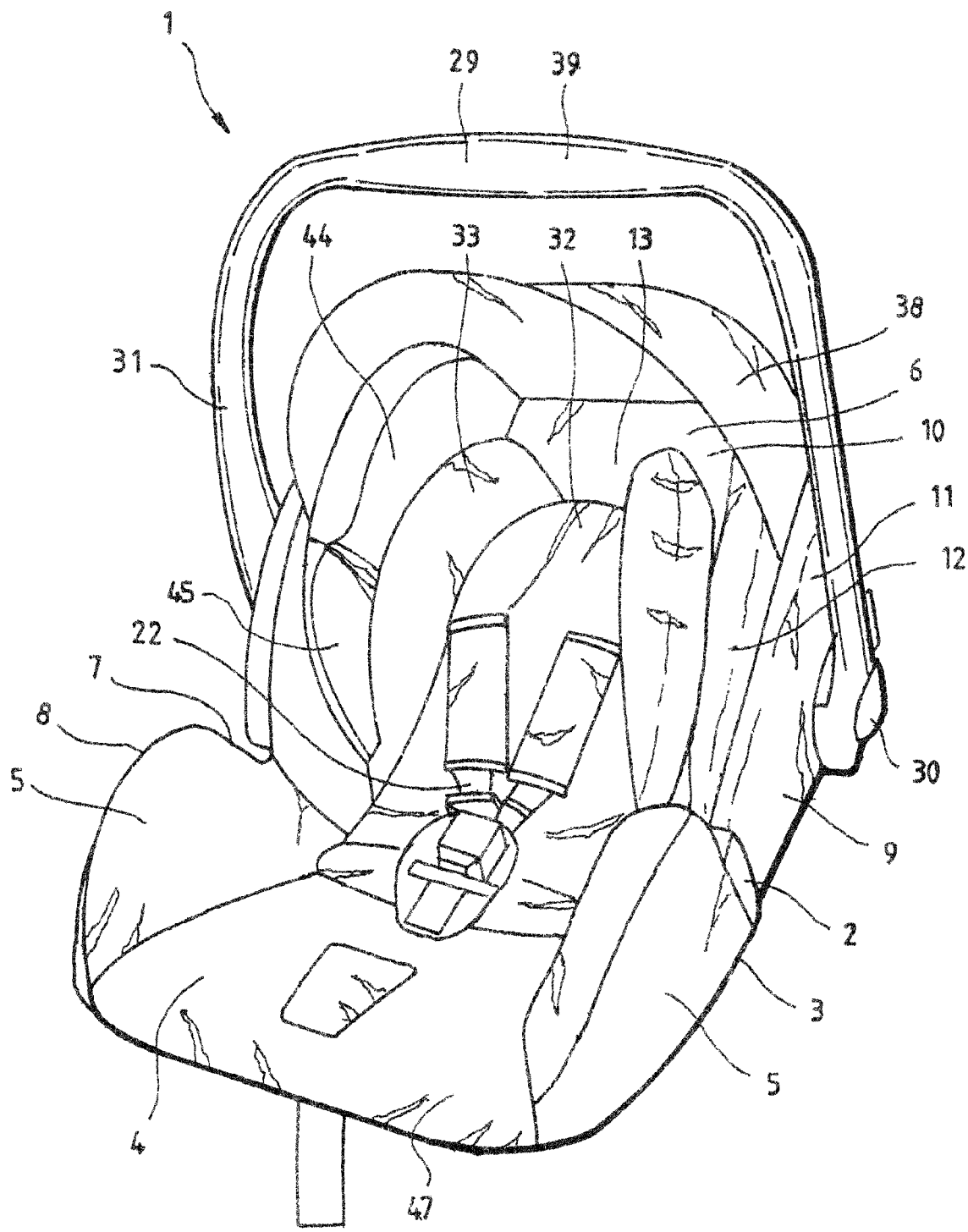
FIG. 1 is a perspective diagram of an inventive reboard system in the configuration designed for newborn infants.

A reboard system 1 according to the present invention comprises a bottom portion 2 having a footprint surface 3, and a top side, implemented as a padded seat surface 4, which is bounded on the sides by two lower lateral body rests 5 and at the back by a relatively flat backrest 6. Both lower lateral body rests 5 are placed besides the thighs of an infant sitting in the reboard system and are used to guide the thighs of the infant as well as to support the forearms of the infant if placed upon such lower lateral body rests 5.

Footprint surface 3 can be arched slightly convexly in the longitudinal direction of reboard system 1, so that the latter can be used on a flat surface as a cradle and so that it can be placed securely on a slightly concavely arched seating surface of a car seat.

The belt proper to the vehicle seat is used to anchor the reboard system 1 thereon, and can be laid in two slit-like recesses 7 at the tops 8 of lower lateral body rests 5 on the one hand, and/or into a further slit 41 at the outer face 21 of the backrest 6, which extends transversely to the seating direction at the center line of the reboard system 1 behind the backrest 6 in a fixed manner, especially in an upper portion thereof, and which is open to its upper side.

Backrest 6 is composed of an unchangeable portion 9 and an extendible portion 10. Each portion 9, 10 possesses two forwardly projecting upper lateral body rests 11, 12. These upper lateral body rests 11, 12 are used to guide the upper part of the body of an infant sitting in the reboard system 1, especially the torso, the upper arms and/or the head of the infant. In contrast to the lower lateral body rests 5, these upper lateral body rests 11, 12 do neither support the forearms of the infant nor guide the thighs of the infant.

The upper lateral body rests 11 of the unchangeable portion 9 of the backrest 6 can merge into the lower lateral body rests 5 of the reboard system 1. For improving the stability of the reboard system 1, the upper lateral body rests 11 of the unchangeable portion 9 of the backrest 6 and the respective lower lateral body rests 5 can be formed integrally.

Preferably, between an upper lateral body rest 11 and the respective lower lateral body rest 5 is located a slit-like recess 7 for the car's seat belt. The bottom of such recess 7 should lie clearly below the top 8 of the respective lower lateral body rest 5, because the reboard system 1 is fixed in a car facing opposite the direction of travel, and therefore, in case of a head-on crash of the car, the reboard system 1 would be urged away from the car's seat with the backrest 6 ahead, if the car's belt within the recesses 7 in front of the top 8 of the lower lateral body rests 5 (in the direction of travel) and in the additional slit 41 at the outer face 21 of the backrest 6 could not hold the reboard system 1 in place.

The extendible portion 10 of backrest 6 is narrower than the unchangeable portion 9, and is accommodated in the manner of a seat size reducer between the upper lateral body rests 11 of unchangeable portion 9, but preferably—in contrast to a real seat size reducer—with a small clearance between both portions 9, 10 of some millimeters, for example 2 to 20 mm, to facilitate a movement of the extendible portion 10 relative to the unchangeable portion 9.

Especially in case of an accident, the extendible portion 10 of the backrest 6 shall be supported and protected by the unchangeable portion 9 of the backrest 6. For this reason, the unchangeable backrest portion 9 is made as stiff and stable as possible. This is achieved by a number of measures:

First, the upper lateral body rests 11 of the unchangeable backrest portion 9 are manufactured with two side walls which are spaced apart from one another and are connected together at their front edges by a narrow front side running along the free circumference of the upper lateral body rests 11, and additionally by some inner bridges or links, which are integrated with both walls. So, the upper lateral body rests 11 have a three-dimensional shape which is much more stable than a flat, single walled lateral rest.

Furthermore, the front side along the free circumference of the upper lateral body rests 11 is arched along a line of nearly semicircular shape with a nearly constant curvature, and this arched front side runs nearly orthogonal to the longitudinal direction of the backrest 6 at its upper end, stabilizing these upper ends additionally. These end areas of the arched front sides of both upper lateral body rests 11 are connected to one another by a flat stripe 52 behind the upper edge 43 of the unchangeable backrest portion 9. This flat stripe 52 runs along the outer face 21 of unchangeable backrest portion 9 and forms a nearly rectangular cove; for this reason, the upper edge 43 of the unchangeable backrest portion 9 will not tend to bend.

Finally, in the area of the inner or front surface of the unchangeable backrest portion 9, there is an arched transition area 53 between the upper lateral body rests 11 and the upper edge 43 and flat stripe 52 along a curvature with a big radius of 3 cm or more, especially 4 cm or more. Such geometry has a maximum stiffness.

Whereas the unchangeable backrest portion 9 has to maintain its form stability or integrity even in case of an accident, the extendible backrest portion 10 shall provide maximum comfort to the infant sitting in the reboard system 1. This is achieved by a two-layer structure of the extendible backrest portion 10: An outer shell 54 is made of plastics; adhered to its front or inner side is a three-dimensional corpus 55 made of a rigid foam in the preferred shape, especially with varying thickness. This corpus 55 can be adapted to the body of an infant, for example it can be formed narrower in the head area and broader at the shoulder area.

An upholstery fabric 56 may cover such corpus 55 and—if desired—a layer of soft foam interposed between the corpus 55 of rigid foam and the fabric 56.

Further, the reboard system 1 may comprise a real seat size reducer 32, for example comprising side cushions 33, which seat size reducer 32 is merely laid on the reboard system 1, especially onto the front face of the extendible portion 10 of backrest 6—on top of the fabric 56—and can be removed at any time. In this configuration, reflected in FIG. 1, the reboard system 1 is particularly suitable for newborns less than about 50 cm long.

In the configuration according to FIG. 1, the upper lateral body rests 11, 12 of both backrest portions 9, 10 lie flatly and roughly congruently besides each other. In the region of the pelvis of an infant, the inner face or bearing surface 13 of the inner, extendible portion 10 of the backrest 6 merges into the seat surface 4 with a gradual curvature and no perceptible buckling, step or edge. This curved region either closely approximates or merges with a sitting plane and a leaning plane. These planes (which may be hypothetical) form a very obtuse angle of about 120° to 140°. Above this curved region, the inner face or bearing surface 13 of the inner, extendible portion 10 of the backrest 6 should be exactly straight in its lengthwise direction, so as to support the dorsum of the infant in an optimal manner independent of the extended position of the extendible portion 10 of the backrest 6.

In the position illustrated in FIG. 1, the center of gravity is located in the rearward half of seat surface 4. Hence, the bearing point of footprint surface 3 is located in this region when the reboard system 1 is placed on a flat surface. The seat surface 4 or seat plane rises to its free edge at an angle of about 10° to 30°; the backrest 6 or back plane rises to its free edge at an angle $\alpha$ of 15° to 45°: $15° \leq \alpha \leq 45°$, and the baby's upper body is therefore raised only slightly at the same, small acute angle $\alpha$.

Figure 2:
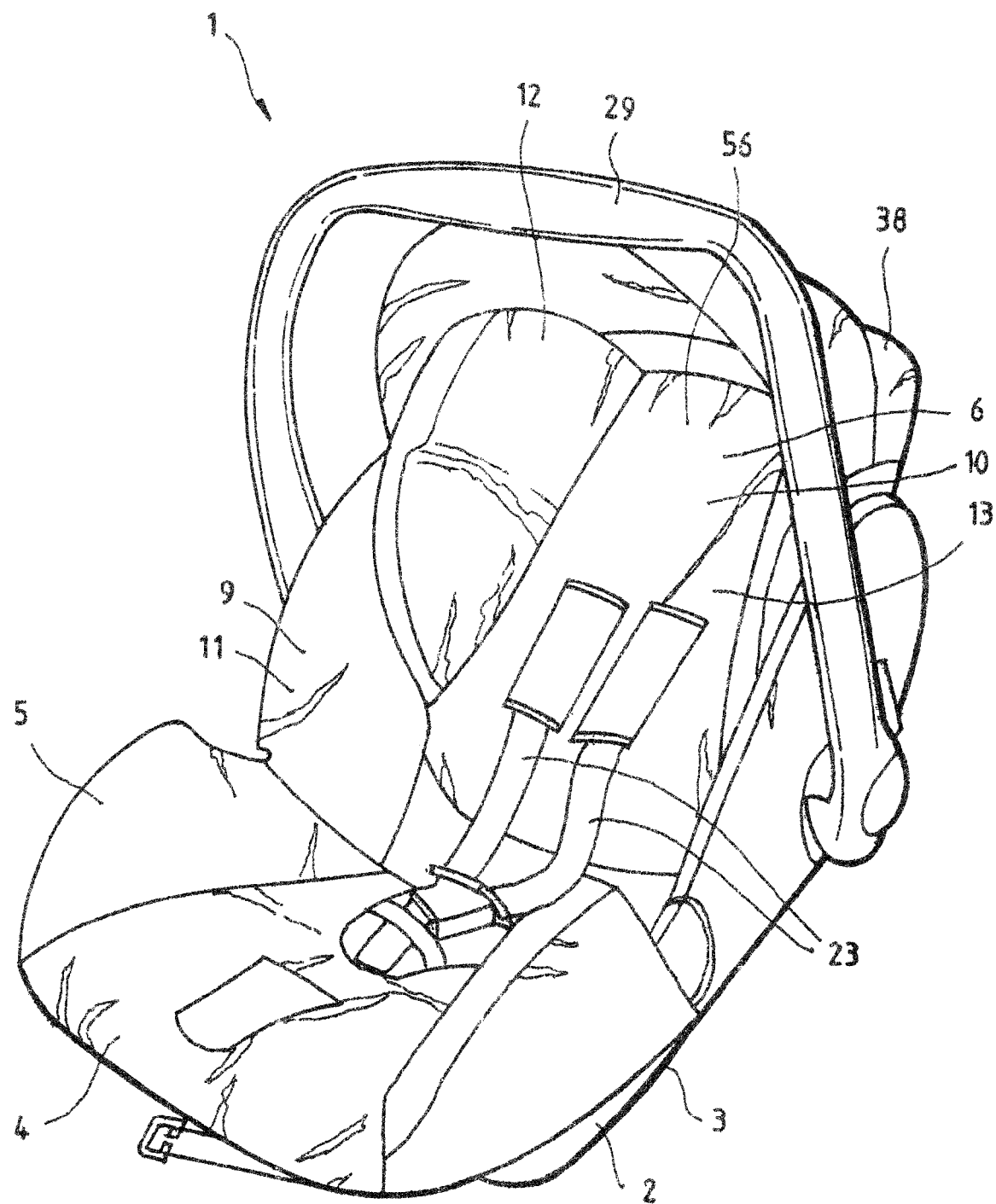
FIG. 2 is a perspective diagram of the reboard system from FIG. 1 in the configuration designed for infants about one year of age.

As can be seen from FIG. 2, movable backrest portion 10 can be extended in the direction of inclination of backrest 6 for a displacement $d_{max}$ of no more than about half the length l of unchangeable portion 9 of backrest 6: $d_{max} \leq l/2$.

At the entirely slid-in position of the extendible portion 10 of the backrest 6, the middle area of its upper edge 42 lies nearly vertical above the middle area of the upper edge 43 of the unchangeable portion 9 of backrest 6. At the other hand, at the entirely or maximum extended position of the extendible portion 10 of the backrest (at the maximum displacement $d_{max}$ along a straight, inclined line), the middle area of its upper edge 42 lies significant behind the middle area of the upper edge 43 of the unchangeable portion 9 of backrest 6, especially at a horizontal space h of $h = d_{max} * \cos \alpha$ behind the upper edge 43 of the unchangeable portion 9 of backrest 6. As $\cos 45° = 1/\text{square root}(2) \cong 0.7$, the horizontal space h between both upper edges 42, 43 at the entirely extended position is greater than 0,7 times the maximum displacement $d_{max}$ of the extendible portion 10 of the backrest 6 in the direction of angle $\alpha$: $h \geq 0.7 * d_{max}$.

By such relative movement between both portions 9, 10 of the backrest 6, adaptation to the increasing height of a child is possible. In this configuration, reflected in FIG. 2, the reboard system 1 is optimized for an older infant about 80 cm tall. As during the growth of a child, the legs grow stronger than the torso and the head, the maximum displacement $d_{max}$ for adaptation from a child's size of 50 cm to a child's size of 80 cm is less than 15 cm, for example $9 \text{ cm} \leq d_{max} \leq 10 \text{ cm}$, so that $h \geq 6.5$ cm. Such significant horizontal displacement h is only possible because the reboard system 1 is fixed in a car facing opposite the direction of travel, so that the backrest 6 does not abut the backrest of the car's seat and therefore the position of the reboard system 1 in the car is not changed during the displacement of the extendible portion 10 of the backrest 6.

Displaceable portion 9 of the backrest 6 now no longer acts as a seat size reducer, but instead as a rest for the head and the shoulders only. As the shoulders of an elder child are significant broader than the shoulders of a newborn, the upper lateral body rests 12 of the extendible portion 10 of the backrest 6 are subdivided into an upper area 44 and a lower area 45. The upper area 44 of each upper lateral body rest 12 is always used as lateral headrest, whereas the lower area 45 is always used as a lateral arm or shoulder rest. Therefore, at the lower area 45, the horizontal distance between both upper lateral body rests 12 is greater than the horizontal distance between the upper areas 44 of the upper lateral body rests 12. This is achieved by reducing the lateral thickness of the upper lateral body rests 12 of the extendible portion 10 of the backrest 6 in their lower regions 45 with regard to their upper regions 44, especially with a (rounded) step 46 between both areas 44, 45, as can be seen best at FIGS. 3, 4. Preferably, distance $l_1$ from the (rounded) step 46 to the upper end of an upper lateral body rest 12 is nearly identical to its distance $l_2$ to the lower end of the upper lateral body rest 12, so that both areas 44, 45 are nearly identical: $0,8<l_1/l_2<1,2$, especially $0,9<l_1/l_2<1,1$. Further, as each upper lateral body rest 12 has a shape similar to a semicircle, its maximum forward extension f measured in a direction perpendicular to the bearing surface 13 of the backrest 6 can be found at the forward end of the (rounded) step 46 and is nearly the same as $l_1$ and $l_2$: $f \cong l_1 \cong l_2$.

Of course, in the state according to FIG. 2, the additional seat size reducer 32 has been removed, too.

Furthermore, movable backrest 10 includes an upper or distal segment comprising a weight-bearing portion 14 made of a rigid material, which is as long as the complete upper lateral body rests 12, and, added to the bottom edge thereof, a flat, lobe-like prolongation 34. Lobe-like portion 34 has roughly the same width as the upper portion 14 of the extendible backrest portion 10 at the lower area 45 of the upper lateral body rests 12; it can even be made of a pliable material such as foam or the like, since lobe-like segment 34 has neither a guiding nor a weight-bearing function, but instead is supported by unchangeable portion 9 of reboard system 1. It is connected to the upper portion 14 of extendible backrest 10 and is further suitable for receiving a lumbar support device (lordosis cushion) for the child. Such a lordosis cushion can be formed by a roll of foam material—having a roughly semicircular cross section, for example—extending transversely to the sitting direction. To its two ends can be fastened the ends of a taut rubber band or the like, which runs behind lobe 34, thereby releasably retaining the lordosis cushion extending in front of it. As can be seen from FIGS. 1 and 2, this substructure 14, 34 of the extendible backrest portion 10 is provided with padding and a cover.

Figure 3:
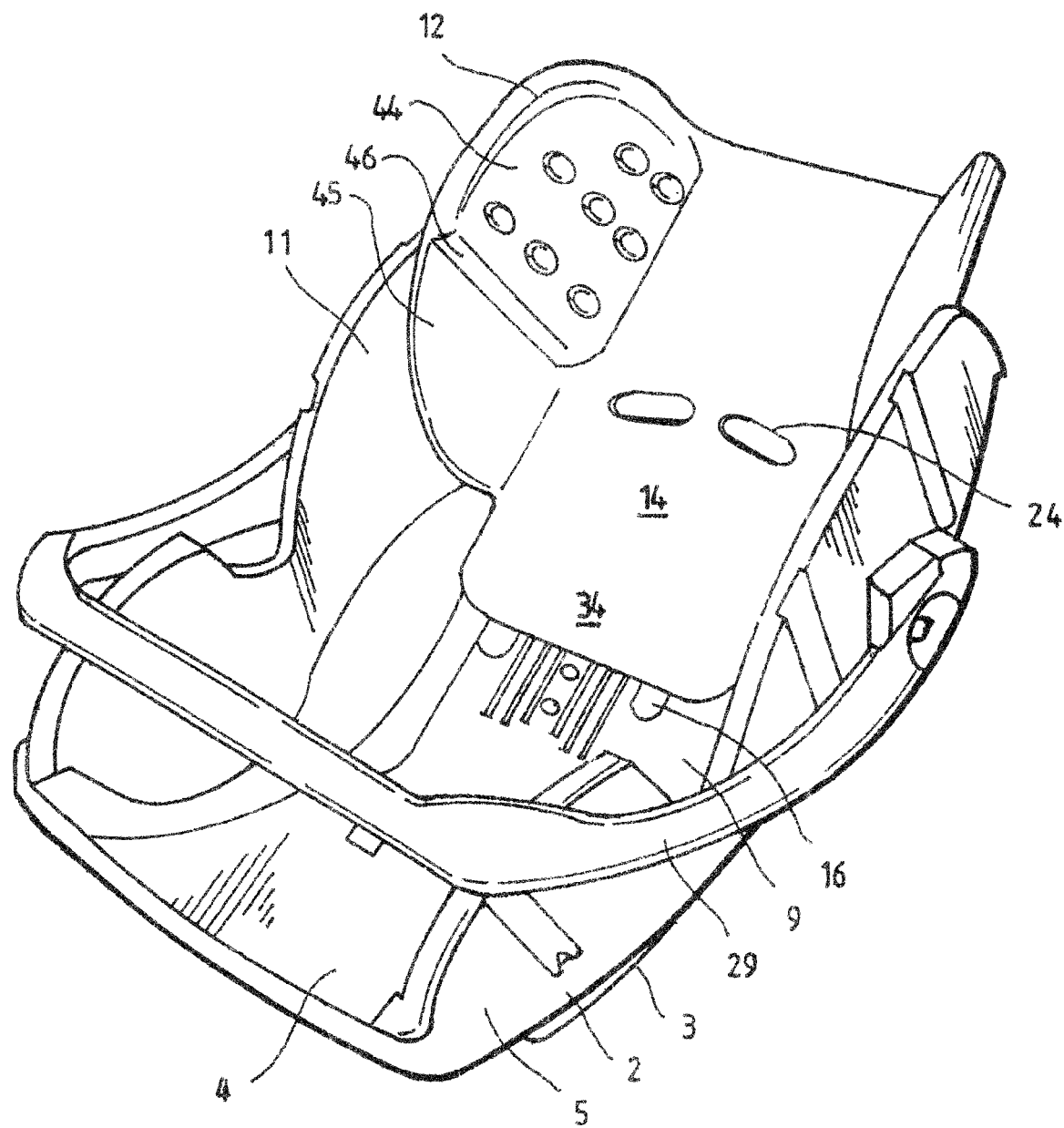
FIG. 3 shows the chassis and the mechanism built into the reboard system from FIG. 1, also in perspective representation.
Figure 4:
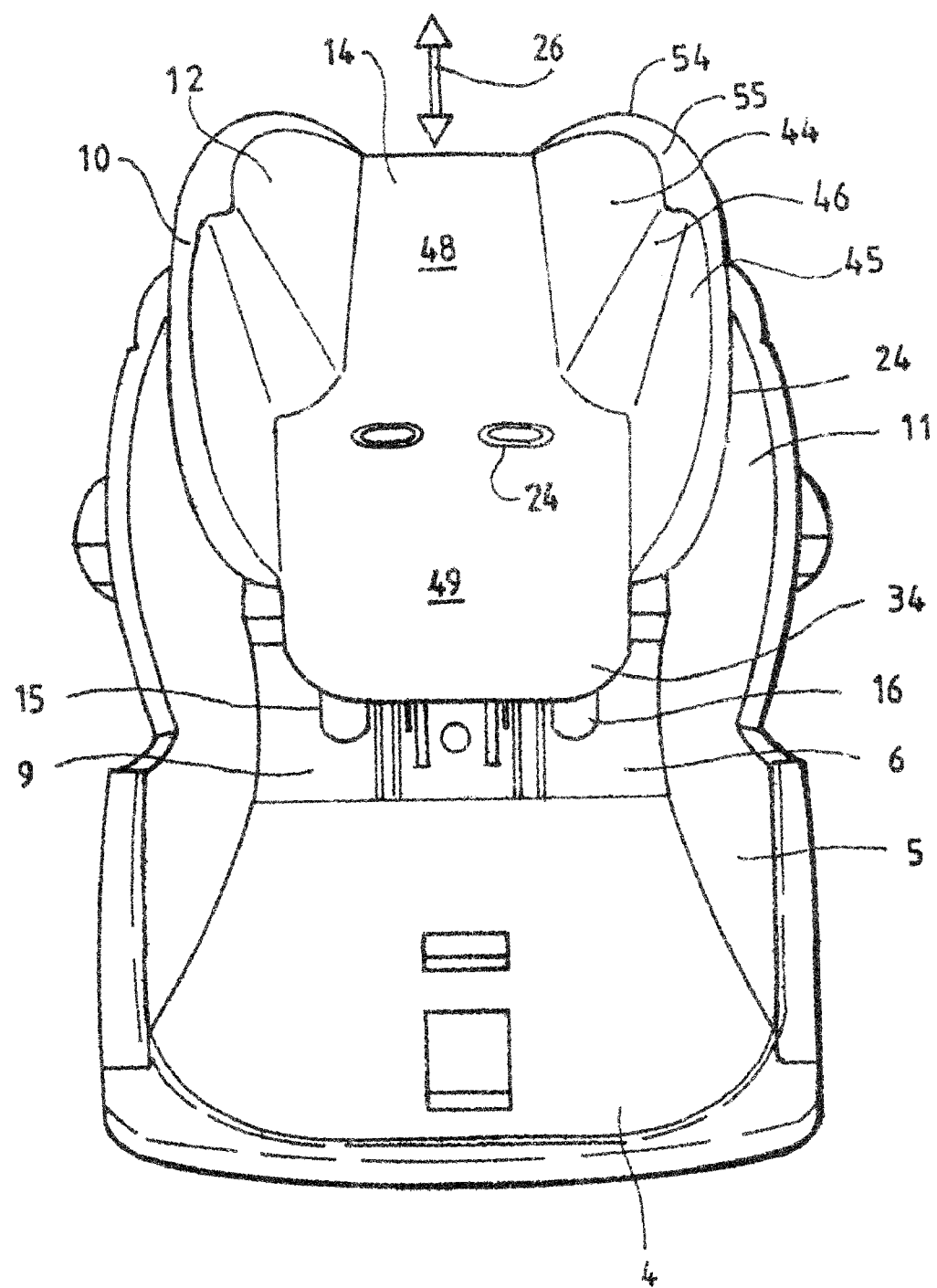
FIG. 4 is a front view of the arrangement of FIG. 3.
Figure 5:
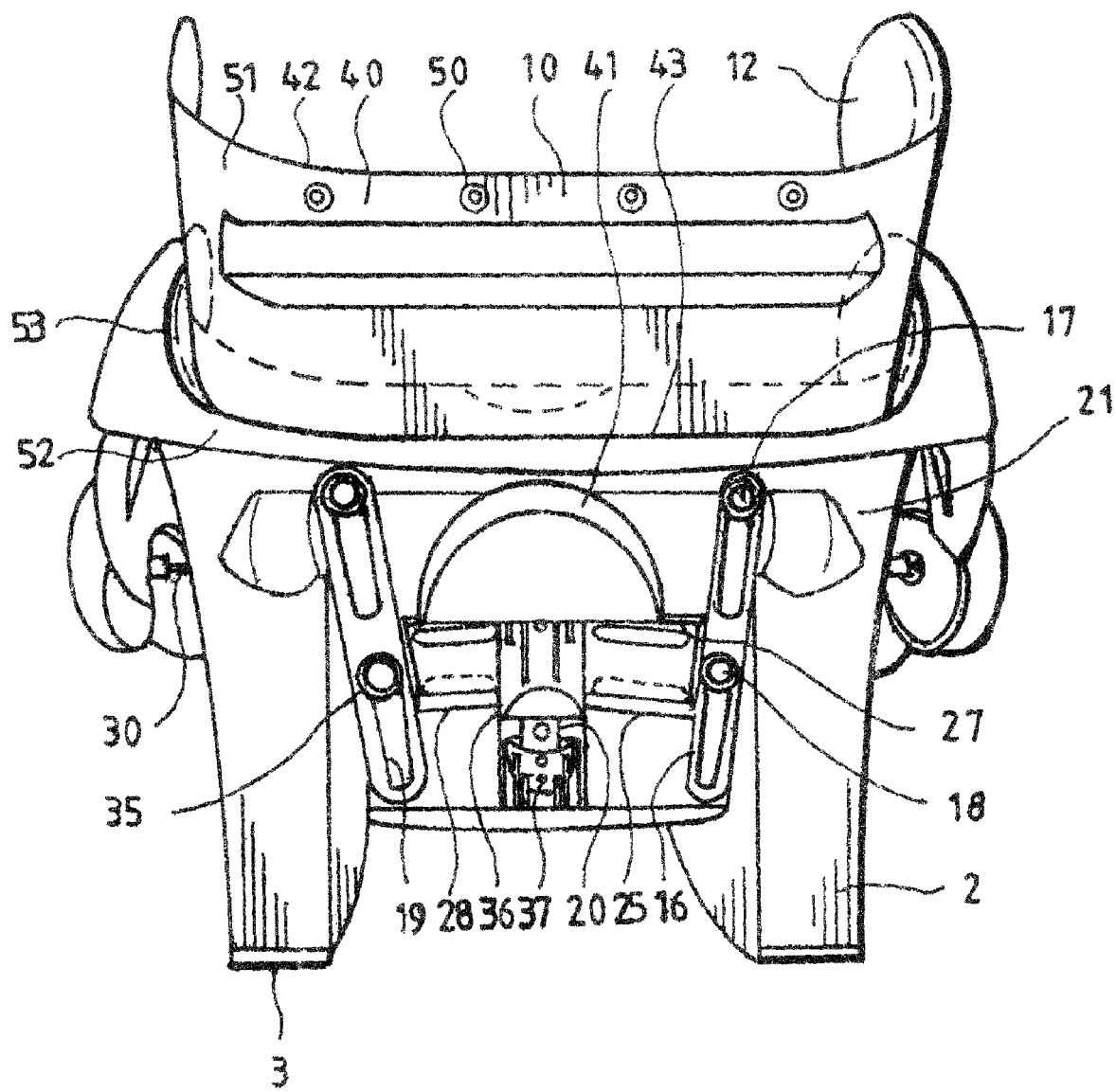
FIG. 5 is a back view of the arrangement of FIG. 3.

The displacement of movable portion 10 of backrest 6 is made possible by a guide mechanism 15, which can be recognized in FIGS. 3 to 5. It consists of several, especially four, mutually parallel slits 16 extending roughly in the sitting direction in the unchangeable portion 9 of backrest 6. Each of these four slits 16 is penetrated by a screw 17 that is screwed into the back face 40 of extendible portion 10 of backrest 6. Said screws 17 are not screwed in completely, so that their shanks pass through the slits 16, and the screw heads 18, together with slipped-on washers 35, embrace the edges 19 of the slits with very little clearance. This clearance is adjusted so that the extendible portion 10 of the backrest 6 can be displaced in the longitudinal direction of the slit 16 without jamming. In the preferred embodiment, the four screws 17 are fixed to the back face 40 of the extendible portion 10 at the corners of a rectangular quadrangle, especially at the corners of a square quadrangle. Therefore, there exist two pairs of mutually aligning slits 16, one pair at the left hand of the reboard system 1 and one at the right hand of the reboard system 1, and all four slits 16 are exactly parallel to one another, and all have the same length. The maximum displacement $d_{max}$ of the extendible portion 10 is defined by the length of one such slit 16 (especially the shortest one), reduced by the shaft diameter of one screw 17.

This mechanism—infinite adjustment along a guide 15 in the (inclined) plane of the backrest 6, together with locking and releasing means 36 that can be accessed from the back or outer face 21 of backrest 6—enables the length of the backrest 6 to be adjusted conveniently even when a child is in the reboard system 1 and/or the reboard system 1 is installed in a vehicle or is to be disengaged therefrom. This is further accomplished by the fact that all slits 16 lie in one single plane, so that the extendible portion 10 is displaced exactly parallel to such plane, especially along a straight line within such plane, without any curvature, so that the body of a child can remain motionless during the displacement of the extendible back portion 10. In this document, the displacement d of the extendible portion 10 relative to the unchangeable portion 9 of the backrest 6 is always measured along this straight line, which is inclined by an angle $\alpha$ against the horizontal plane.

So that the extendible portion 10 of the backrest 6 can be locked in both end positions and optionally also in some intermediate positions, a plurality of bores 20 is provided in the substructure of extendible rest portion 10, preferably in a row one after the other along the central axis or axis of symmetry of said rest portion 10. Disposed in the bottom or outer face 21 of reboard system 1 is a locking means in the form of a tab 36 that can be moved roughly in the sitting direction relative to the unchangeable portion 9 of reboard system 1. This degree of freedom of movement results from the fact that said tab 36 is connected only along a small portion of its circumference to unchangeable rest portion 9 and thus can be bent away therefrom. Formed on the inner face (not visible in FIG. 5) of this tab 36 is a pin 37 or lug that passes through one of the bores 20 and thereby blocks any displacing movement of extendible portion 10 of the backrest 6. In the force-free state, tab 36 is pressed inward in such a way that pin 37 engages firmly in the bore 20 concerned, and therefore is self-arresting. A rearward handle on tab 36, for example a formed-on recessed grip, allows tab 36 to be pulled backward conveniently. This locking means or tab 36 can be actuated at any time, independent of a child being seated in the reboard system 1 or not. As the locking means or tab 36 has no contact with any belt, neither with the car's seat belt nor with any belt of the reboard system 1 itself, it can be actuated even if a seat belt 22 of the reboard system 1 is fastened; then, the extendible portion 10 can be slid in temporarily—for example for fastening or releasing a car's seat belt—and then drawn outside to its original position again, without any motion of the child.

According to FIGS. 1 and 2, the reboard system 1 according to the present invention is provided with a harness belt 22 to hold the infant securely during a car ride. Harness belt 22 comprises two shoulder belts 23, each of which has a buckle tongue at its free end, plus a short, lower belt that is anchored or guided roughly centrally to the seat surface 4 and carries at its free end a belt buckle in which the buckle tongues can be releasably inserted.

Each of the two shoulder belts 23 is guided through a respective transversely extending slit 24 in the upper portion 14 of displaceable portion 10 of backrest 6 and through a respective longitudinal slit 25 in unchangeable portion 9 of backrest 6. On the back face 21 thereof, the two shoulder belts 23 can be connected to each other and/or to a tensioning device or other anchoring means, particularly to the fixed portion 9 of reboard system 1.

The transverse slits 24 in movable backrest portion 10 are disposed on either side of the central axis or the axis or plane of symmetry thereof and are each fitted to the cross section of a respective shoulder belt 23, with clearance in the range of 2 to 15 mm in each case. The locking system 20 must be made sturdy enough so that it is capable of absorbing the belt tension forces acting in the direction of displacement 26 when the shoulder belts 23 are deflected downwardly behind transverse slits 24. In each extended position of the extendible portion 10, the shoulder belts 23 are deflected directly at the rear lower edge of the slits 24 in a direction towards the front end 47 of the reboard system 1.

The transverse slits 24 are situated near a line connecting both (rounded) steps 46 between the upper and lower portions 44, 45 of the lateral arm rests 12 of the extendible portion 10 of the backrest 6, or barely beneath such line, especially in an area where the upper lateral body rests 12 of the extendible portion 10 of the backrest 6 have there maximum forward extension f perpendicular to the bearing surface 13 of the backrest 6.

For example, the transverse slits 24 divide the extendible portion 10 of the backrest in an upper area 48 and a lower area 49, whereby the length or longitudinal extension $h_1$ of the lower area 49 is greater than one third of the length or longitudinal extension $h_2$ of the upper area 48: $h_1 \geqq 0{,}33*h_2$, especially greater than one half of the longitudinal height $h_2$ of the upper area 48: $h_1 \geqq 0{,}5*h_2$, about three-fourths of the longitudinal height $h_2$ of the upper area 48: $h_1 \cong 0{,}75*h_2$. In any case, the longitudinal extensions or heights $h_1$, $h_2$ of each area 48, 49 are greater than the maximum displacement $d_{max}$ of the extendible portion 10 of the backrest 6: $h_1 > d_{max}$, $h_2 > d_{max}$, and therefore the overall length or overall longitudinal extension $(h_1 + h_2)$ of the extendible backrest portion 10 is greater than two times the maximum displacement $d_{max}$: $(h_1 + h_2) > 2*d_{max}$.

On the other hand, the transverse slits 24 lie on both sides of a center point, where the two diagonal lines of a quadrangular, defined by one of the four screws 17 in each corner, meet or cross each other.

Longitudinal slits 25 are located behind transverse slits 24. Whereas their width is roughly equal to the width of the shoulder belts 23 plus clearance, their length must be at least as great as the distance between the two outermost lock bores 20. When extendible portion 10 of the backrest 6 is in the fully retracted position, a transverse slit 24 is located roughly at the height of the top edge 27 of the longitudinal slit 25 concerned, while when extendible portion 10 of the backrest 6 is in the maximally extended position it is located at the height of the bottom edge 28 of the longitudinal slit 25 concerned, so that the passage of the belt is not impeded. Therefore, the length of the longitudinal slits 25 is somewhat greater than the maximum displacement $d_{max}$ of the extendible portion 10.

Disposed on the extendible portion 10 of backrest 6 is a canopy 38 that protects an infant from rain or bright sunlight. Since it is fastened to movable rest portion 10, this canopy 38 is displaced according to the position of extendible backrest 10 and, so to speak, grows with it. It can therefore—in contrast to conventional reboard systems—be used until the child has fully outgrown the reboard system 1. Canopy 38 can be attached by means of snap fasteners 50 at the outer surface 51 of the extendible backrest portion 10, shortly beneath the upper edge 42 of the extendible backrest portion 10. This is possible because of the clearance between both portions 9, 10 of the backrest, and therefore the canopy may be removable, for example during transport in a car.

A carrying handle 29 is articulated 30 to the outer faces of bottom portion 2 or lower lateral body rests 5 so as to be swivelable about a transversely extending axis of rotation. The side legs 31 of carrying handle 29 are longer than seat surface 4 and/or longer than backrest 6 in their maximally lengthened configuration. In this way, carrying handle 29 can be placed in different positions and then locked in any of them, for example in the carrying position shown in FIG. 1 or 2; in a position above seat surface 4 for transport in a car (see FIGS. 3 and 5); or in a position behind backrest 6, as shown in FIG. 4, in which case the crossbar 39 of carrying handle 29 extends in approximately a common plane with a central segment of footprint surface 3 of reboard system 1 so that the latter can be placed on a flat surface without tipping or rocking.

| Reference numerals |
|---|
| 1  reboard system |
| 2  bottom portion |
| 3  footprint surface |
| 4  seat surface |
| 5  lower lateral body rest |
| 6  backrest |
| 7  slit-like recess |
| 8  top of arm support |
| 9  unchangeable portion |
| 10  extendible portion |
| 11  upper lateral body rest |
| 12  upper lateral body rest |
| 13  bearing surface of backrest |
| 14  upper portion of backrest |
| 15  guide mechanism |
| 16  slit |
| 17  screw |
| 18  screw head |
| 19  edge |
| 20  bore |
| 21  outer face of backrest |
| 22  harness belt |
| 23  shoulder belt |
| 24  transversely extending slit |
| 25  longitudinal slit |
| 26  direction of displacement |
| 27  top edge of longitudinal slit |
| 28  bottom edge of long. slit |
| 29  carrying handle |
| 30  articulation |
| 31  side leg |
| 32  seat size reducer |
| 33  side cushion |
| 34  lobe-like prolongation |
| 35  washer |
| 36  releasing mechanism or tab |
| 37  pin |
| 38  canopy |
| 39  crossbar |
| 40  back face of extendible portion |
| 41  further slit |
| 42  upper edge of extendible p. |
| 43  upper edge of unchanged p. |
| 44  upper area of lateral body rest |
| 45  lower area of lateral body rest |
| 46  step |
| 47  front end |
| 48  upper area |
| 49  lower area |
| 50  snap fastener |
| 51  outer surface of extend. por. |
| 52  flat stripe |
| 53  arched transition area |
| 54  outer shell |
| 55  three-dimensional corpus |
| 56  upholstery fabric |

What is claimed is:

1. A child seat for transporting infants or toddlers generally in a half-lying, half-sitting position in a car, the seat comprising:
   a seat surface;
   a backrest inclined shallowly relative to said seat surface, said backrest provided with an unchangeable portion and an extendable portion, a length of said backrest being adapted to be varied by a guided parallel shift of the extendable portion relative to said seat surface, such that a middle area of an upper edge of the extendable portion, in at least one state of operation, projects over the unchangeable portion of said backrest in a direction of travel of the car;

wherein the guided parallel shift extends substantially in a direction of a spine of a child seat occupant and is adapted to be varied when the child seat occupant is seated in the child seat and/or when the child seat is fastened on a seat of the car;

wherein the guided parallel shift is along a straight line which is inclined by a constant angle α against a horizontal plane, rising in a direction of travel of the car;

wherein the extendable portion of said backrest is provided with upper lateral body rests for substantially guiding shoulders and/or upper arms of the child seat occupant;

wherein said backrest is provided with at least one guide member disposed at a rear backrest outer face for receiving and guiding a portion of a safety belt proper to the car; and wherein, at a maximum extended position of the extendable portion of said backrest, in which the extendable portion of said backrest is displaced along the straight line for a maximum displacement $d_{max}$ from an entirely slid-in position, a middle area of the upper edge of the extendable portion lies, in the direction of travel, substantially in front of a middle area of an upper edge of the unchangeable portion of said backrest, by a horizontal distance h of equal or more than 0.7 times $d_{max}$: $h \geq 0.7 * d_{max}$ in front of the upper edge of the unchangeable portion of said backrest, in particular by a horizontal distance h of $h = d_{max} * \cos \alpha$.

2. The child seat in accordance with claim 1, wherein the constant angle α against the horizontal plane is 15°-45°.

3. The child seat in accordance with claim 1, wherein the extendable part of said backrest in the entirely slid-in position extends downwardly to proximate said seat surface.

4. The child seat in accordance with claim 1, wherein the extendable portion of said backrest is at least partially encompassed in a supporting way at an outer side by the unchangeable portion of said backrest.

5. The child seat in accordance with claim 1, wherein the upper edge of the extendable portion of said backrest in any extended position and in the direction of travel, protrudes in front of the upper edge of the unchangeable portion of said backrest.

6. The child seat in accordance with claim 1, wherein the extendable portion of said backrest comprises a plate- or lobe-shaped extension, provided in a region of a bottom edge of the extendable portion of said backrest.

7. The child seat in accordance with claim 1, wherein said backrest further comprises a guide mechanism, wherein the extendable portion of said backrest is displaceable along said guide mechanism.

8. The child seat in accordance with claim 1, wherein the extendable portion of said backrest is adapted to be locked in place on the unchangeable portion of said backrest by a self-arresting means.

9. The child seat in accordance with claim 8, wherein the self-arresting means comprises a series of openings or recesses and a lock pin on the extendable portion of said backrest and/or on the unchangeable portion of said backrest, wherein the lock pin is adapted to be passed through an opening or a recess of the series of openings or recesses.

10. The child seat in accordance with claim 1, the unchangeable portion of said backrest comprising upper lateral body rests, wherein said upper lateral body rests of the extendable portion of said backrest are located between said upper lateral body rests of the unchangeable portion of said backrest.

11. The child seat in accordance with claim 1, and further comprising a belt harness provided to securely hold the child seat occupant.

12. The child seat in accordance with claim 1, and further comprising a carrying handle adjustably anchored to the seat.

13. The child seat in accordance with claim 1, and further comprising a canopy disposed on the extendable portion of said backrest and which is provided to protect the child seat occupant from rain or sunlight.

14. A child seat safety system, comprising:
a child seat in accordance with claim 1; and further comprising:
a safety belt that is adapted to be anchored to a body of the car;
wherein, in a state of the child seat being fastened on the seat of the car, a portion of said safety belt is adapted to be received and guided by the at least one guide member of said backrest.

15. A child seat for transporting infants or toddlers generally in a half-lying, half-sitting position in a car, the seat comprising:
a seat surface;
a backrest inclined shallowly relative to said seat surface, said backrest provided with an unchangeable portion and an extendable portion, a length of said backrest being adapted to be varied by a guided parallel shift of the extendable portion relative to said seat surface, such that a middle area of an upper edge of the extendable portion, in at least one state of operation, projects over the unchangeable portion of said backrest in a direction of travel of the car;

wherein the guided parallel shift follows generally a direction of a spine of a child seat occupant and is adapted to be accomplished when the child seat occupant is seated in the child seat and/or when the child seat is fastened on a seat of the car;

wherein the guided parallel shift is along a straight line which is inclined by a constant angle α against a horizontal plane, rising in the direction of travel of the car;

wherein the extendable portion of said backrest is provided with upper lateral body rests for substantially guiding shoulders and/or upper arms of the child seat occupants;

said backrest having at least one guide member located at a rear backrest outer face for receiving and guiding a portion of a safety belt proper to the car; and wherein the upper edge of the extendable portion of said backrest in any extended position and in the direction of travel, protrudes in front of an upper edge of the unchangeable portion of said backrest.

16. The child seat in accordance with claim 15, wherein the constant angle α against the horizontal plane is 15°-45°.

17. The child seat in accordance with claim 15, wherein, at a maximum extended position of the extendable portion of said backrest, in which the extendable portion of said backrest is displaced along the straight line for a maximum displacement $d_{max}$ from an entirely slid-in position, the middle area of the upper edge of the extendable part lies, in the direction of travel, substantially in front of a middle area of the upper edge of the unchangeable portion of said backrest, namely by a horizontal distance h of equal or more than 0.7 times $d_{max}$, h≧0.7*$d_{max}$ in front of the upper edge of the unchangeable portion of said backrest, particularly by a horizontal distance h of h=$d_{max}$*cos α.

18. The child seat in accordance with claim 15, wherein the extendable portion of said backrest in the entirely slid-in position extends downwardly proximate to seat surface.

19. The child seat in accordance with claim 15, wherein the extendable portion of said backrest is at least partially encompassed in a supporting manner at an outer side by the unchangeable portion of the backrest.

20. The child seat is accordance with claim 15, wherein the extendable portion of said backrest comprises a plate- or lobe-shaped extension provided in a region of a bottom edge of the extendable part of said backrest.

21. The child seat in accordance with claim 15, wherein said backrest further comprises a guide mechanism, wherein the extendable portion of said backrest is displaceable along said guide mechanism.

22. The child seat in accordance with claim 15, wherein the extendable portion of said backrest is adapted to be locked in place on the unchangeable portion of said backrest by a self-arresting means.

23. The child seat in accordance with claim 22, wherein the self-arresting means comprises a series of opening or recesses and a lock device that are provided on the extendable portion of said backrest and/or on the unchangeable portion of said backrest, wherein the lock device is adapted to be passed through an opening or a recess of the series of opening or recesses.

24. The child seat in accordance with claim 15, wherein the unchangeable portion of said backrest comprises upper lateral body rests, and wherein said upper lateral body rests of the extendable portion of said backrest are disposed between the upper lateral body rests of the unchangeable portion of said backrest.

25. The child seat in accordance with claim 15, and further comprising a belt harness provided to securely hold the child seat occupant.

26. The child seat in accordance with claim 15, and further comprising a carrying handle adjustably anchored to the seat.

27. The child seat in accordance with claim 15, and further comprising a canopy disposed on the extendable portion of said backrest and which is provided to protect the child seat occupant from rain and sunlight.

28. A child seat for transporting infants or toddlers generally in a half-lying, half-sitting position in a car, the seat comprising:
 a seat surface;
 a backrest inclined shallowly relative to said seat surface, said backrest having an unchangeable portion and extendable portion, a length of said backrest adapted to be varied by a guided parallel shift of the extendable portion relative to said seat surface, such that a middle area of an upper edge of the extendable portion, in at least on state of operation, projects over the unchangeable portion of said backrest in a direction of travel of the car;
 wherein the guided parallel shift follows essentially a direction of a spine of a child seat occupant and is adapted to be varied when the child seat occupant is seated in the child seat and/or when the child seat is fastened on a seat of the car;
 wherein the guided parallel shift is along a straight line which is inclined by a constant angle α against a horizontal plane, rising in the direction of travel of the car;
 wherein the extendable portion of said backrest is provided with upper lateral body rests for substantially guiding shoulders and/or upper arms and/or a head of the child seat occupant; and
 wherein each of the upper lateral body rests is divided by a step, respectively, into an upper area which is provided as a lateral headrest, and a lower area, which is provided as a lateral arm and/or shoulder rest;
 said backrest having at least one guide member located at a rear backrest outer face for receiving and guiding a portion of a safety belt proper to the car,
 wherein, at a maximum extended position of the extendable portion of said back-rest, in which the extendable portion of said backrest is displaced along a straight line for a maximum displacement $d_{max}$ from an entirely slid-in position, the middle area of the upper edge of the extendable portion lies, in the direction of travel, substantially in front of a middle area of an upper edge of the unchangeable portion of said backrest, by a horizontal distance h of equal or more than 0.7 times $d_{max}$: h≧0.7*$d_{max}$ in front of the upper edge of the unchangeable portion of the backrest, by a horizontal distance h of h=$d_{max}$*cosα.

29. The child seat in accordance with claim 28, further comprising a belt harness;
 wherein the extendable portion of said backrest is provided with slits extending transversely to the direction of travel of the car; and
 wherein the belt harness is fed through the transversely extending slits that are provided generally at a same height as steps between the upper area and lower area of the upper lateral body rest of the extendable part of said backrest.

30. The child seat in accordance with claim 28, wherein the constant angle α against the horizontal plane is 15°-45°.

31. The child seat in accordance with claim 28, wherein the extendable portion of said backrest in the entirely slid-in position extends downwardly adjacent to said seat surface.

32. The child seat in accordance with claim 28, wherein the extendable portion of said backrest is at least partially encompassed in a supporting way at an outer side by the unchangeable portion of said backrest.

33. The child seat in accordance with claim 28, wherein the upper edge of the extendable portion of said backrest in any extended position and in the direction of travel, protrudes forwardly of the upper edge of the unchangeable portion of said backrest.

34. The child seat in accordance with claim 28, wherein the extendable portion of said backrest comprises a plate- or lobe-shaped extension that is provided in a region of a bottom edge of the extendable portion of said backrest.

35. The child seat in accordance with claim 28, said backrest further comprising a guide mechanism, wherein the extendable portion of said backrest is displaceable along said guide mechanism.

36. The child seat in accordance with claim 28, wherein the extendable part of said backrest is adapted to be locked in place on the unchangeable portion of said backrest by a self-arresting means.

37. The child seat in accordance with claim 36, wherein the self-arresting means comprises a series of openings or recesses and a lock pin provided on the extendable portion of said backrest and/or on the unchangeable portion of said backrest, wherein said lock pin is adapted to be passed through an opening or a recess of said series of openings or recesses.

38. The child seat in accordance with claim 28, wherein the unchangeable portion of said backrest comprises upper lateral body rests, wherein said upper lateral body rests of the extendable portion of said backrest are disposed between the upper lateral body rests of the unchangeable portion of said backrest.

39. The child seat in accordance with claim 28, and further comprising a belt harness adapted to securely hold the child seat occupant.

40. The child seat in accordance with claim 28, and further comprising a carrying handle adjustably anchored to the seat.

41. The child seat in accordance with claim 28, and further comprising a canopy disposed on the extendable portion of said backrest and adapted to protect the child seat occupant from rain or sunlight.

42. A child seat for transporting infants or toddlers in a generally half-lying, half-sitting position in a car, the seat comprising:
a seat surface;
a backrest inclined shallowly relative to said seat surface, said backrest having an unchangeable portion and an extendable portion, a length of said backrest being adapted to be varied by a guided parallel shift of the extendable portion relative said seat surface, such that a middle area of an upper edge of the extendable portion, in at least one state of operation, projects over the unchangeable portion of said backrest in a direction of travel of the car;
wherein the guided parallel shift follows substantially a direction of a spine of a child seat occupant and is adapted to be operative when the child seat occupant is seated in the child seat and/or when the child seat is fastened on a seat of the car;
wherein the guided parallel shift is along a straight line which is inclined by a constant angle $\alpha$ against a horizontal plane, rising in a direction of travel of the car;
wherein the extendable part of said backrest is provided with upper lateral body rests for substantially guiding shoulders and/or upper arms and/or a head of the child seat occupant; and
wherein each of the upper lateral body rests is divided by a step into an upper area which comprises a lateral headrest, and a lower area, which comprises a lateral arm and/or shoulder rest; and
said backrest having at least one guide member located at a rear backrest outer face for receiving and guiding a portion of a safety belt proper to the car;
wherein the upper edge of the extendable part of said backrest in any extended position and in the direction of travel, protrudes in front of the upper edge of the unchangeable portion of said backrest.

43. The child seat in accordance with claim 42, and further comprising a belt harness;
wherein the extendable portion of said backrest is provided with slits extending transversely to the direction of travel of the car, and wherein said belt harness is adapted to be fed through the transversely extending slits provided approximately at the same height as steps between the upper area and lower area of the upper lateral body rest of the extendable portion of said backrest.

44. The child seat in accordance with claim 42, wherein the constant angle $\alpha$ against the horizontal plane is 15°-45°.

45. The child seat in accordance with claim 42, wherein, at a maximum extended position of the extendable portion of said backrest, in which the extendable portion of said backrest is displaced along the straight line for a maximum displacement $d_{max}$ from an entirely slid-in position, the middle area of the upper edge of the extendable portion lies, in the direction of travel, significantly in front of a middle area of an upper edge of the unchangeable portion of said backrest, namely by a horizontal distance h of equal or more than 0.7 times $d_{max}$: $h \geq 0.7 * d_{max}$, in front of the upper edge of the unchangeable portion of said backrest, particularly by a horizontal distance h of $h = d_{max} * \cos \alpha$.

46. The child seat in accordance with claim 42, wherein the extendable portion of said backrest in the entirely slid-in position extends downwardly to adjacent the seat surface.

47. The child seat in accordance with claim 42, wherein the extendable portion of said backrest is at least partially encompassed in a supporting manner at an outer side by the unchangeable portion of said backrest.

48. The child seat in accordance with claim 42, wherein the extendable portion of said backrest comprises a plate- or lobe-shaped extension provided in a region of a bottom edge of the extendable portion of said backrest.

49. The child seat in accordance with claim 42, wherein said backrest further comprises a guide mechanism and the extendable portion to said backrest is displaceable along said guide mechanism.

50. The child seat in accordance with claim 42, wherein the extendable portion of said backrest is adapted to be locked in place on the unchangeable portion of said backrest by a self-arresting means.

51. The child seat in accordance with claim 50, wherein the self-arresting means comprises a series of openings or recesses and a lock pin provided on the extendable portion of said backrest, and/or on the unchangeable portion of said backrest, wherein the lock pin is adapted to be passed through an opening or a recess of the series of openings or recesses.

52. The child seat in accordance with claim 42, wherein the unchangeable portion of said backrest comprises upper lateral body rests, wherein the upper lateral body rests of the extendable portion of said backrest are disposed between the upper lateral body rests of the unchangeable portion of said backrest.

53. The child seat in accordance with claim 42, and further comprising a belt harness adapted to securely hold the child seat occupant.

54. The child seat in accordance with claim 42, and further comprising a carrying handle adjustably anchored to the seat.

55. The child seat in accordance with claim 42, and further comprising a canopy disposed on the extendable portion of said backrest and which is adapted to protect the child seat occupant from rain or sunlight.

* * * * *